United States Patent
Kreutz et al.

(10) Patent No.: US 10,710,627 B2
(45) Date of Patent: Jul. 14, 2020

(54) STEERING WHEEL FOR A MOTOR VEHICLE STEERING SYSTEM AND STEERING COLUMN FOR A MOTOR VEHICLE

(71) Applicants: THYSSENKRUPP PRESTA AG, Eschen (LI); thyssenkrupp AG, Essen (DE)

(72) Inventors: Daniel Kreutz, Feldkirch (AT); Sebastian Forte, Mauren (LI); Tim Bayer, Grabs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/349,145

(22) PCT Filed: Dec. 13, 2017

(86) PCT No.: PCT/EP2017/082692
§ 371 (c)(1),
(2) Date: May 10, 2019

(87) PCT Pub. No.: WO2018/109039
PCT Pub. Date: Jun. 21, 2018

(65) Prior Publication Data
US 2019/0291772 A1    Sep. 26, 2019

(30) Foreign Application Priority Data

Dec. 16, 2016 (DE) .......................... 10 2016 225 297

(51) Int. Cl.
*B62D 1/10* (2006.01)
*B62D 1/183* (2006.01)

(52) U.S. Cl.
CPC ................ *B62D 1/10* (2013.01); *B62D 1/183* (2013.01)

(58) Field of Classification Search
CPC .................................. B62D 1/10; B62D 1/183
See application file for complete search history.

(56) References Cited

U.S. PATENT DOCUMENTS

| 1,621,206 | A |   | 3/1927 | Kacziba |
| 2,988,931 | A | * | 6/1961 | Markley, Jr. ............ B62D 1/10 |
|           |   |   |        | 74/556 |

(Continued)

FOREIGN PATENT DOCUMENTS

| DE | 868 557 C | 2/1953 |
| DE | 947287 C | 8/1956 |

(Continued)

OTHER PUBLICATIONS

English Translation of International Search Report issued in PCT/EP2017/082692, dated Apr. 3, 2018.

*Primary Examiner* — Vicky A Johnson
(74) *Attorney, Agent, or Firm* — thyssenkrupp North America, LLP

(57) ABSTRACT

A motor vehicle steering system includes a steering wheel hub which has a longitudinal axis and can be attached coaxially on a rotatably mounted steering spindle, and a steering wheel rim which is attached on the steering wheel hub at a radial spacing from the longitudinal axis and extends in a planar manner transversely with respect to the longitudinal axis. The steering wheel rim is mounted on the steering wheel hub in a bearing such that it can be inclined with respect to the longitudinal axis between an operating position and a stowed position about an inclination axis which lies transversely with respect to the longitudinal axis. The steering wheel rim is inclined at a flatter angle with (Continued)

respect to the longitudinal axis in the stowed position than when in the operating position.

17 Claims, 2 Drawing Sheets

(56) References Cited

U.S. PATENT DOCUMENTS

| | | | | |
|---|---|---|---|---|
| 3,395,930 | A * | 8/1968 | Morgan | B62D 1/10 |
| | | | | 280/775 |
| 5,419,215 | A * | 5/1995 | Herron | B62D 1/181 |
| | | | | 280/775 |
| 6,389,858 | B1 | 5/2002 | Lee | |
| 7,331,608 | B2 * | 2/2008 | Armstrong | B62D 1/181 |
| | | | | 280/775 |
| 7,621,562 | B2 * | 11/2009 | Longo | B62D 1/187 |
| | | | | 280/775 |

FOREIGN PATENT DOCUMENTS

| | | |
|---|---|---|
| DE | 102006006995 A | 8/2007 |
| DE | 10 2015 207 477 A | 10/2016 |
| DE | 20 2016 005 986 U | 1/2018 |
| EP | 1486395 A | 12/2004 |
| EP | 2 567 878 B | 11/2015 |
| FR | 984 910 A | 7/1951 |
| FR | 2 861 657 A | 5/2005 |

\* cited by examiner

STEERING WHEEL FOR A MOTOR VEHICLE STEERING SYSTEM AND STEERING COLUMN FOR A MOTOR VEHICLE

CROSS REFERENCE TO RELATED APPLICATIONS

This application is a U.S. National Stage Entry of International Patent Application Serial Number PCT/EP2017/082692, filed Dec. 13, 2017, which claims priority to German Patent Application No. DE 10 2016 225 297.6, filed Dec. 16, 2016, the entire contents of both of which are incorporated herein by reference.

FIELD

The present disclosure generally relates to a steering wheel for a motor vehicle steering system.

BACKGROUND

Steering columns for motor vehicles have a steering shaft with a steering spindle, on the rear (in the driving direction) end of which, which faces the driver, a steering wheel is attached for the introduction of manual steering commands by way of the driver. The steering spindle is mounted rotatably in a supporting unit which is connected to the vehicle body.

The steering wheel has fastening means, by way of which the steering wheel hub is coaxially fastened fixedly on the rear end (which faces the driver) of the steering spindle so as to rotate with it, the longitudinal axis of the steering wheel hub being identical to the axis of the steering spindle. The steering wheel hub supports the steering wheel rim which forms an annular or annular section-shaped grip element for the steering intervention. The steering wheel rim surrounds the steering wheel hub continuously or in sections at a spacing from the longitudinal axis, the grip element or elements being arranged in a planar arrangement substantially parallel to a rotational plane which lies perpendicularly with respect to the longitudinal axis. In the classic shape, the steering wheel rim can be of circumferential configuration in a round manner with a hoop-shaped grip element; in order to optimize the ergonomics and the design, it can have a shape which is flattened, rectangular or irregular, and continuous or interrupted over the circumference.

In the conventional, manual operating state, the steering wheel is positioned in the vehicle interior compartment, with the result that it can be reached comfortably by way of the driver for a manual steering intervention and can be operated in an ergonomically favorable manner. For this purpose, it is known to design the steering column to be adjustable longitudinally and vertically, with the result that the spacing and the height of the steering wheel can be set within a typical range of possible handling or operating positions. In the automated driving mode in the case of autonomous driving, the steering of the vehicle takes place in an automated manner on the basis of measured and predefined control parameters which set the steering angle of the wheels via electromechanical actuators, in order to follow a predefined steering trajectory. A manual steering intervention by way of the driver is no longer required, and the aim is correspondingly to move the steering wheel which projects into the vehicle interior compartment in the operating state into a stowed position outside possible handling positions of the operating position, in order for it to be possible for the vehicle interior compartment which becomes free as a result to be utilized in an alternative manner.

FR 2861657 A1 has disclosed a vehicle steering system, having a steering unit which has a steering wheel which is attached by way of its steering wheel hub on the steering spindle, a supporting unit for rotatably mounting the steering spindle, and an electronic sensor system for detecting steering commands. The entire steering unit can be positioned relative to the vehicle interior compartment in the longitudinal direction on a positioning apparatus, and can be inclined in its entirety on the positioning device. The complicated construction is a disadvantage here. Moreover, said steering system can be used exclusively for pure steer-by-wire steering systems, in the case of which no mechanical connection of the steering spindle to the wheels is provided.

In order for it to be possible for the steering wheel to be moved out of the handling region, what are known as "head tilt" steering systems are known, as described in EP 2 567 878 B1, for example. Here, the steering spindle is connected at its front end which is remote from the steering wheel via a universal joint to the steering shaft, and is mounted such that it can be tilted relative to the vehicle body around a tilt joint. As a result, the entire steering spindle including the steering wheel which is attached fixedly on it can be inclined forward. The complicated construction and the limited possibilities for stowing the steering wheel in the vehicle interior compartment are disadvantageous.

Thus a need exists for a steering wheel which makes improved stowing and more widespread possible uses possible, and which has a simpler construction which is as compact as possible.

DETAILED DESCRIPTION

Figure 1:
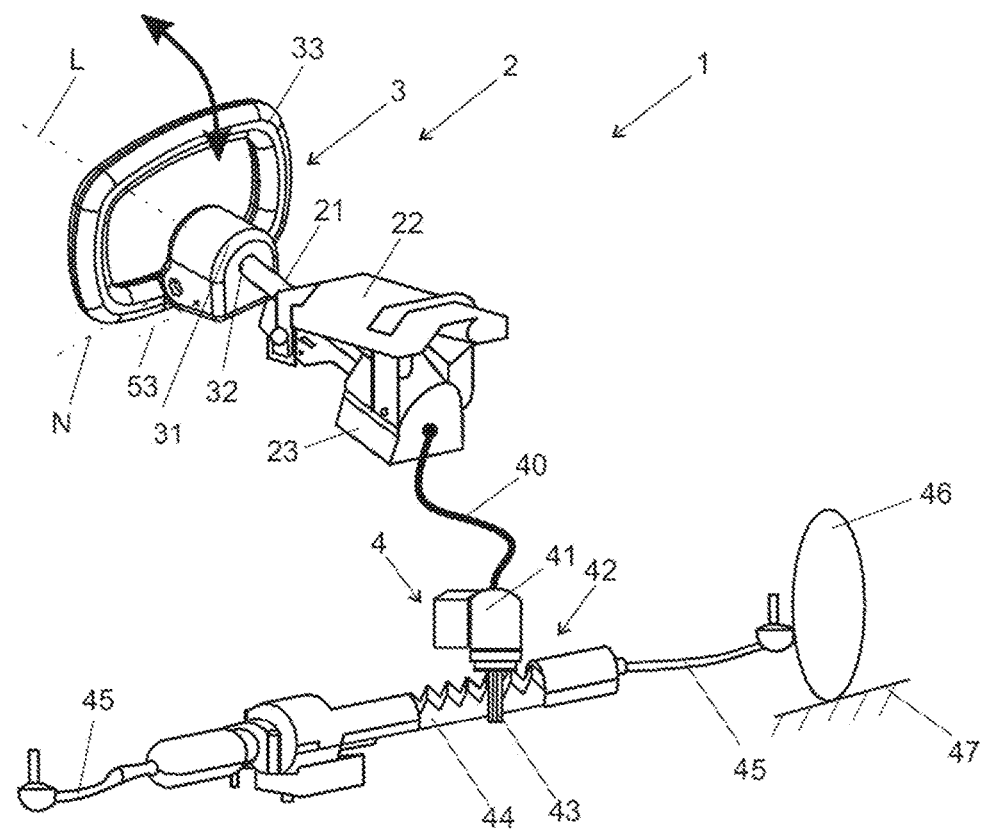
FIG. 1 is a diagram of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering wheel for a motor vehicle steering system, comprising a steering wheel hub which has a longitudinal axis and can be attached coaxially on a rotatably mounted steering spindle, and a steering wheel rim which is attached on the steering wheel hub, is at a radial spacing from the longitudinal axis, and extends in a planar manner transversely with respect to the longitudinal axis.

In some examples, the steering wheel rim is mounted on the steering wheel hub in a bearing such that it can be inclined with respect to the longitudinal axis between an operating position and a stowed position about an inclination axis which lies transversely with respect to the longitudinal axis, the steering wheel rim being inclined at a flatter angle with respect to the longitudinal axis in the stowed position than in the operating position.

According to the invention, the steering wheel rim is connected movably to the steering wheel hub, to be precise can be tilted via a bearing of hinge-like configuration. By way of tilting about the inclination axis which is predefined by way of the bearing, the inclination of the steering wheel rim relative to the steering wheel hub can be set, and therefore also relative to a steering spindle of a vehicle steering system, on which steering spindle the steering wheel hub is coaxially fastened fixedly so as to rotate with it, preferably at its rear (with regard to the driving direction) end which faces the driver in the vehicle interior compartment.

The inclination axis forms a transverse axis which lies transversely with respect to the longitudinal axis of the steering wheel hub or the steering spindle. In relation to the vehicle, the inclination axis lies horizontally transversely with respect to the driving direction. By way of rotation about said inclination axis, the steering wheel rim can therefore selectively be inclined or tilted forward or rearward in the vehicle interior compartment. As a result, it is possible, for example, to fold the steering wheel rim out of an operating position, in which it extends perpendicularly with respect to the longitudinal axis and the grip element or elements lies/lie parallel to a rotational plane of the steering wheel hub or the steering spindle, into a stowed position which is inclined forward. In the stowed position, the steering wheel rim is inclined to a more pronounced extent with respect to the longitudinal axis than in the operating position, in which it lies perpendicularly with respect to the longitudinal axis. As a result, the handling space which is taken up by the steering wheel rim in the operating or handling position is freed up for some other use. As an alternative, the operating position can be present in such a way that it does not lie exactly perpendicularly with respect to the longitudinal axis, but rather is inclined for comfort reasons for the driver by an angle which is smaller than the angle, at which the steering wheel is situated in the stowed position. Said angle can preferably lie in a range between 2° and 15°.

One advantage of the invention is that the steering wheel hub and the steering spindle remain connected fixedly to one another so as to rotate together and, in the case of the stowing according to the invention of the steering wheel rim, do not have to be moved with respect to one another and also not in the vehicle interior compartment. This has the advantage that the handling position of the steering column, which handling position is set individually for a driver, can remain set, and only the steering wheel rim is moved out of the handling region. In comparison with a steering unit which additionally comprises the steering spindle including the bearing system and the supporting unit, the steering wheel rim has a considerably lower mass and, as a result, can be moved out of the operating position into the stowed position and back again with a lower effort. As a result, a more rapid change of the positions can take place with a relatively lower drive effort, which represents a safety aspect, in particular, in the case of autonomous driving if the steering wheel has to be moved rapidly out of the stowed position into the operating position in the case of a switchover from automatic to manual driving operation. In the prior art, in which the entire steering unit or the steering spindle has to be moved, this is not possible or is possible only with great complexity, in particular in terms of time.

A further advantage of the invention is that space-saving stowing of the steering wheel is also possible in the case of steering columns which have a mechanically continuous steering shaft which adjoins the steering spindle, that is to say not only in the case of steer-by-wire steering systems. In the case of said steering columns, an advantageous use of the invention is likewise possible.

In the prior art, the rotational plane of the steering wheel hub, which rotational plane can be denoted as identical to the rotational plane which lies perpendicularly with respect to the longitudinal axis of the steering spindle and can therefore be called a steering wheel hub rotational plane or steering spindle rotational plane, is arranged parallel to the steering wheel rotational plane, with respect to which the steering wheel rim lies substantially in parallel, or in which or parallel to which the grip element or elements is/are arranged. The steering wheel rotational plane lies unchangeably perpendicularly with respect to the steering spindle, to be precise both in the steering unit which can be adjusted as a whole in accordance with FR 2861657 A1 and in the case of "head tilt" steering systems as known from EP 2 567 878 B1. In accordance with the invention, in contrast, it is made possible for the steering wheel rim rotational plane to be tilted with respect to the steering spindle rotational plane by way of the inclination of the steering wheel rim relative to the steering wheel hub, the steering wheel rim being inclined in a flatter manner with respect to the longitudinal axis, that is to say being folded against the longitudinal axis, as it were. As a result, the inclination of the grip elements of the steering wheel can be set in the vehicle interior compartment relative to the steering spindle.

The inclination axis can preferably be at a radial spacing from the longitudinal axis, which radial spacing is smaller than the spacing of the steering wheel rim from the longitudinal axis. As a consequence, the inclination axis runs within the steering wheel rim, to be precise horizontally below the longitudinal axis of the steering column in the installed position on the steering spindle of a steering column in the vehicle interior compartment. As a result, favorable kinematics can be realized during stowing, in the case of which kinematics the steering wheel rim can be folded during the inclination forward over the steering wheel hub which is stationary with regard to the steering spindle; the steering wheel hub is then situated in a space-saving manner in that inner region of the steering wheel rim which is enclosed completely or partially by the steering wheel rim.

One advantageous embodiment of the invention provides that the steering wheel hub has a releasable fixing device which can be moved selectively into at least one fixing position or one release position, the steering wheel rim being fixed relative to the steering wheel hub in a fixing position, and it being possible for the steering wheel rim to be inclined relative to the steering wheel hub in the release position. The fixing device makes it possible to fix the steering wheel rim relative to the steering wheel hub, in particular in the operating position, when a fixed seat of the steering wheel rim has to be ensured during the introduction of a manual steering torque, and also in the stowed position, in which the steering wheel rim has to be held reliably. Accordingly, the fixing position can be activated at least in the operating position and the stowed position. In order to make a change between the stowed position and the operating position and vice versa possible, the fixing device is released, that is to say is moved into the release position. The steering wheel rim can then be tilted into the envisaged inclined position by way of rotation in the bearing, and can be fixed there again.

The fixing device can have an adjustable fixing element which is supported on the steering wheel hub and, in the fixing position, can be brought into engagement in a positively locking and/or non-positive manner with a corresponding counter-element on the steering wheel rim. In the fixing position of the fixing device, the fixing element and the counter-element interact, with the result that the inclination movement of the steering wheel rim relative to the steering wheel hub is fixed, that is to say the rotation about the inclination axis is blocked. The fixing element can be moved selectively into the fixing position or into the release position by way of the fixing device.

The fixing element can have, for example, a positively locking element which can be configured from a metal or plastic and can be configured as a cam, a latch, a pawl or the like, and which, in order to form a positively locking connection which is active with regard to a rotational movement between the steering wheel rim and the steering wheel hub, can be brought releasably into engagement with a counter-element of corresponding configuration, for example into a depression or opening. To this end, the positively locking element can be capable of being moved between the fixing position and the release position.

An advantage of said arrangement is that fixing positions of the steering wheel rim which are defined unambiguously by way of the possible positively locking engagement position or positions can be predefined, for example in the operating position or the stowed position. As an alternative or in addition, a fixing element can have a non-positive or frictionally locking element which makes the generation of a non-positive connection between the steering wheel rim and the steering wheel hub possible. For example, the fixing element can be configured or arranged in the bearing, and can make fixing of the bearing by way of frictionally locking bracing possible, for example by a bearing shell being fixedly clamped radially on a bearing pin.

The fixing device can preferably have a motorized actuator for setting the fixing position or the release position in a motorized manner. The motorized actuator preferably has an electromechanical actuating element which interacts with the fixing element. By way of corresponding activation of the actuator, for instance by way of the energization of an electromechanical actuator, a force can be exerted on the fixing element via the actuating element, with the result that said fixing element can be moved into the fixing position; for example, a positively locking element is moved into positively locking engagement with a counter-element, or a non-positive element is braced. By way of an actuation of the actuator in the opposite direction, the fixing element can be moved into the release position.

The activation of the actuator can take place manually, for example by way of an electric switch which can be arranged, for example, on the steering wheel rim and, upon actuation, energizes the electric motor actuator in order to set the fixing position or release position. As an alternative or in addition, the actuator can be activated or deactivated by way of control signals, in order, for example, to release the steering wheel rim in certain driving situations in an automated manner into the operating position, in order to make a manual steering input possible, or else in order to prevent a release if a manual steering intervention might be critical.

An actuator can be realized, for example, by way of a spindle drive which is driven by electric motor and has an actuating element which can be moved by way of rotation of a spindle with a spindle nut which is arranged thereon. A fixing element which can be driven rotationally by way of an electric motor is likewise conceivable and possible, also such as an electromagnetically drivable actuating element.

One embodiment of the invention provides that a torque generating device is arranged between the steering wheel hub and the steering wheel rim, by which torque generating device a torque can be exerted on the steering wheel rim about the inclination axis. The steering wheel rim can be rotated in the bearing relative to the steering wheel hub by way of the torque generating device, with the result that an inclination of the steering wheel rim relative to the steering wheel hub takes place. As a result, the steering wheel rim can be driven by motor, for example from the stowed position into the operating position or vice versa. The torque generating apparatus can have a motorized drive device, such as an electric motor which makes an automated motorized inclination of the steering wheel rim possible.

In one advantageous embodiment, the torque generating device has an energy store or force accumulator, for example a spring element. Said spring element can be arranged between the steering wheel rim and the steering wheel hub in such a way that it is stressed elastically when the steering wheel rim is moved into the stowed position, for example by way of manual tilting. The energy which is stored in the spring element in said stowed position can be used to move the steering wheel rim in an automated manner out of the stowed position into the operating position. In order to realize a functionality of this type, it is appropriate that a fixing device of the abovementioned type is provided. As a result, the steering wheel rim can be held fixedly in the stowed position counter to the spring force which is directed in the direction of the operating position. Here, the energy store forms an elastic prestressing device which prestresses the steering wheel rim in the direction of the operating position. If the fixing device is released, the steering wheel rim is erected into the operating position by way of the spring force.

Furthermore, the invention relates to a steering column for a motor vehicle, comprising a steering spindle which is mounted in a supporting unit such that it can be rotated about a longitudinal axis, on the rear end (in relation to the driving direction of the vehicle) of which steering spindle a steering wheel hub of a steering wheel is attached coaxially, a steering wheel rim being attached on the steering wheel hub, which steering wheel rim is at a radial spacing from the longitudinal axis and extends in a planar manner transversely with respect to the longitudinal axis. Arrangements of this type having a steering wheel hub of a steering wheel, which steering wheel hub is fastened fixedly on the steering spindle so as to rotate with it, are known. It is provided in accordance with the invention that the steering wheel rim is mounted on the steering wheel hub in a bearing such that it can be inclined with respect to the longitudinal axis between an operating position and a stowed position about an inclination axis which lies transversely with respect to the longitudinal axis, the steering wheel rim being inclined at a flatter angle with respect to the longitudinal axis in the stowed position than in the operating position.

The steering wheel can comprise the above-described features and combinations of features according to the invention. In the steering column according to the invention, the steering wheel according to the invention is fastened by way of the steering wheel hub on the steering spindle. For a given position of the steering wheel, which position can be predefined by way of the arrangement, and, in so far as it is a height-adjustable and/or length-adjustable steering column, the setting of the steering column, it is possible to move the steering wheel rim forward into a stowed position by way of inclination with respect to the longitudinal axis, or to erect the steering wheel rim in order to set the operating position, with the result that said steering wheel rim lies substantially parallel to the rotational plane of the steering wheel hub, that is to say the steering wheel rim lies perpendicularly with respect to the longitudinal axis of the steering spindle.

The invention comprises a method for adjusting a steering wheel which comprises a steering wheel hub which has a longitudinal axis and can be attached coaxially on a rotatably mounted steering spindle, and a steering wheel rim which is attached on the steering wheel hub, is at a radial spacing from the longitudinal axis, and extends in a planar manner transversely with respect to the longitudinal axis, the steering wheel rim being mounted on the steering wheel hub in a bearing such that it can be inclined with respect to the longitudinal axis between an operating position and a stowed position about an inclination axis which lies transversely with respect to the longitudinal axis, the steering wheel rim being inclined at a flatter angle with respect to the longitudinal axis in the stowed position than in the operating position, and the steering wheel hub having a releasable fixing device which can be moved selectively into a fixing position or a release position, the steering wheel rim being fixed relative to the steering wheel hub in the fixing position, and it being possible for the steering wheel rim to be inclined relative to the steering wheel hub in the release position.

The method comprises the steps:
moving the fixing device into the release position,
inclining the steering wheel rim relative to the steering wheel hub about the inclination axis,
moving the fixing device into the fixing position.

In the first step, the fixing device is released. This can take place, for example, in the operating position, for example by way of actuation of an electric motor actuator which releases a fixing element as described above from a counter-element. As a result, a rotational movement of the steering wheel rim about the inclination axis relative to the steering wheel hub is enabled. The steering wheel rim can then be tilted about the inclination axis in the bearing, with the result that the steering wheel rim is moved out of the perpendicular operating position into the stowed position which is inclined at a flatter angle relative to the steering spindle. As soon as the stowed position is reached, the fixing device is moved into the fixing position. As a result, the steering wheel rim is locked in the stowed position.

In order to move the steering wheel into the handling or operating position, the abovementioned steps are carried out starting from the stowed position. After the release of the fixing device, the steering wheel rim is once again inclined about the inclination axis, this time, however, in order to direct the steering wheel rim with respect to the steering spindle to such an extent that the operating position is reached, in which the steering wheel rim lies perpendicularly with respect to the longitudinal axis. In the operating position, the steering wheel rim is locked relative to the steering wheel hub by way of fixing of the fixing device, and is fixed securely in order to carry out manual steering interventions.

FIG. 1 diagrammatically shows a steering system 1, specifically a steer-by-wire steering system for a motor vehicle, which steering system has a steering column 2 as a manual input device. The steering column 2 has a steering spindle 21 which is held in a supporting unit 22 in a manner which is mounted such that it can be rotated about its longitudinal axis L, which supporting unit 22 can be connected to a vehicle body (not shown).

On the rear (with regard to the driving direction) end which faces the driver, a steering wheel 3 is fastened fixedly on the steering spindle 21 so as to rotate with it with regard to a rotation about the longitudinal axis L. Said steering wheel-side end points at the top left obliquely toward the rear in the illustration of FIG. 1.

The rotational movement of the steering spindle 21 is detected by an electric control unit 23 which actuates an electric actuating motor 41 of an electric steering drive 4 via an electric line 40. The electric actuating motor 41 introduces a steering actuating torque into a steering gear 42, which steering actuating torque is converted there via a pinion 43 and a rack 44 into a translational movement of track rods 45, as a result of which a steering angle of the steered wheels 46 on a roadway 47 is brought about.

FIGS. 2, 3, 4 and 5 show the steering wheel 3 in a side view transversely with respect to the longitudinal axis L in different operating states which will be described further below. The steering wheel-side, rear end of the steering column 1 points to the right in this illustration.

The steering wheel 3 has a steering wheel hub 31 which is shown diagrammatically in a transparent manner, in order to reveal a view of parts which lie in the interior. The steering wheel hub 31 has a fastening opening 32 which is oriented coaxially with respect to the longitudinal axis L and in which the steering wheel-side end of the steering spindle 21 can be attached fixedly. As a result, in the assembled state which is shown in FIG. 1, the steering wheel hub 31 and the steering spindle 21 are connected to one another fixedly, in particular fixedly so as to rotate together. An airbag is preferably integrated in the steering wheel hub 31. Further handling and/or comfort elements, such as a vehicle horn, an indicator apparatus or an actuating apparatus for the vehicle illumination, can be provided on the steering wheel hub 31.

A steering wheel rim 33 is attached on the steering wheel hub 31. The steering wheel rim 33 has the form of a flat grip element which is annularly circumferential, is formed as a rounded rectangle in the embodiment which is shown, and extends in a planar manner in a plane, the steering wheel rim rotational plane. The steering wheel rim 33 is around an inclination axis N by virtue of the fact that it has a bearing sleeve 34 which is mounted such that it can be rotated about said inclination axis N on a bearing pin 35 which is attached fixedly in the steering wheel hub 31. As a result, an inclination movement of the steering wheel rim 33 relative to the steering wheel hub 31 is made possible, as indicated by way of the double arrow in FIG. 1. During the inclination, the steering wheel rim rotational plane is inclined with respect to the steering wheel hub rotational plane or steering spindle rotational plane out of the operating position, in which it lies parallel to said steering wheel hub rotational plane or steering spindle rotational plane.

Figure 2:
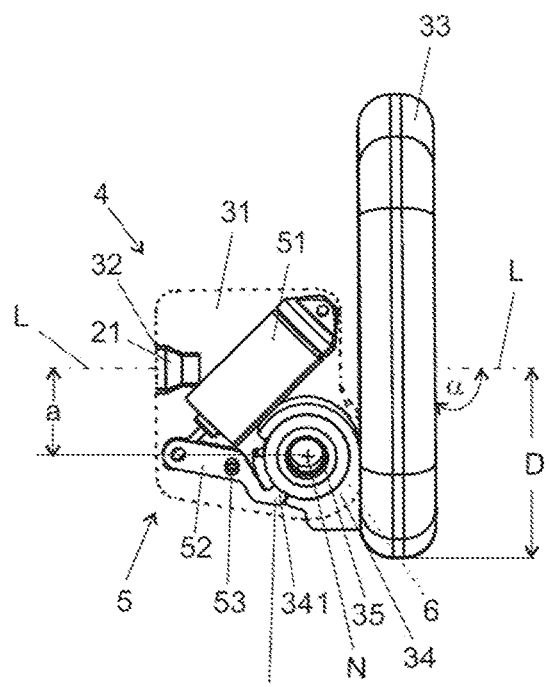
FIG. 2 is a side view diagram of a steering wheel in the operating position, in the fixing position.

The inclination axis N lies perpendicularly or approximately perpendicularly with respect to the longitudinal axis L, and is at a spacing a from the longitudinal axis L. The spacing a is smaller than the spacing D of the steering wheel rim 33 from the longitudinal axis L; this means the radial spacing D of the outer circumference of the steering wheel rim 33 from the longitudinal axis L, as shown in FIG. 2.

Accordingly, the inclination axis N runs within the steering wheel rim 33. In relation to the installed position in the vehicle, the inclination axis N lies horizontally below the longitudinal axis L, that is to say runs parallel to the longitudinal extent of the rack 44.

The steering wheel 3 has a fixing device 5, with a motorized actuator 51 which is configured, for example, as a spindle drive which is driven by electric motor, and which motorized actuator 51 is supported in the steering wheel hub 31. The actuator 51 acts on a fixing element 52 which is configured as a pivoting lever, can be pivoted about a pivot axis 53 in a manner which is driven by the actuator 51, and has a positively locking element which is configured as a cam 54 at its free end.

The bearing sleeve 34 of the steering wheel rim 33 has depressions 341 and 342 which are made in its outer circumference, and into which the cam 54 of the fixing element 52 can engage in a positively locking manner. The depressions 341, 342 preferably have a sliding layer or a damper, in order to cushion the movement of the cam 54. It is also conceivable and possible that the cam 54 has a damping element or a damping layer is configured, in order to extend the service life of the fixing device by way of the damping of hard impacts.

FIG. 2 shows the steering wheel 3 in the operating position (also called a handling position), in which the steering wheel rim 33 lies with its planar extent perpendicularly with respect to the longitudinal axis L. The angle α (alpha) between the steering wheel rim 33 and the longitudinal axis L is accordingly 90°. For reasons of comfort, the inclination angle α of the steering wheel rim 33 in relation to the longitudinal axis L can be configured to be smaller than 90°, for example can lie in a range between 75° and 89.5°, or else can be greater than 90°, for example can lie in a range between 90.5° and 100°. In FIG. 2, the actuator 51 is situated in the fixing position, the cam 54 engaging in a positively locking manner into the depression 341. As a result, the bearing sleeve 34 and therefore the steering wheel rim 33 are fixed to the steering wheel hub 31 with regard to a rotation about the inclination axis N, and are therefore locked in the operating position.

Figure 3:
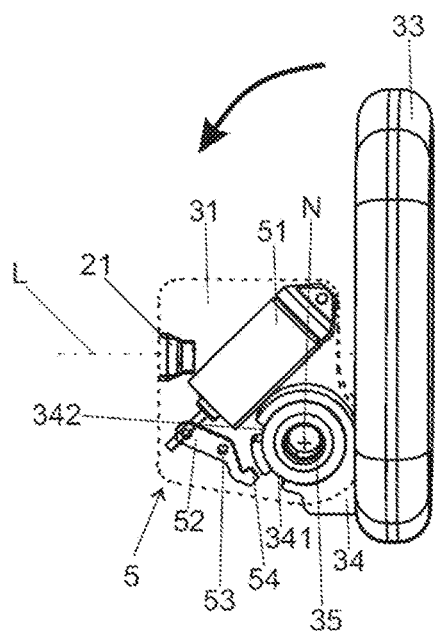
FIG. 3 is a side view diagram of a steering wheel as in FIG. 2 in the operating position, in the release position.
Figure 4:
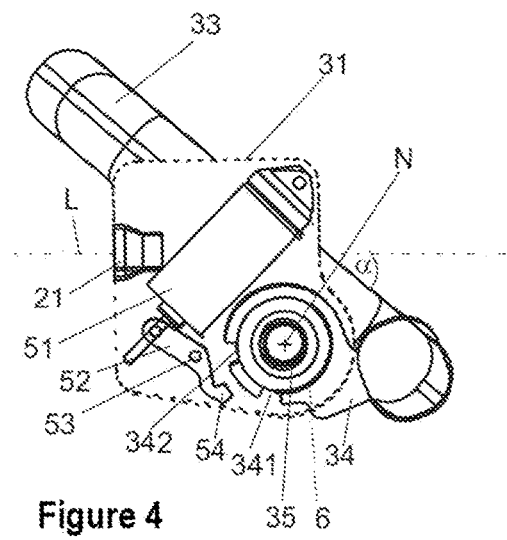
FIG. 4 is a diagram of a steering wheel in a view as in FIG. 1 in the stowed position, in the fixing position.
Figure 5:
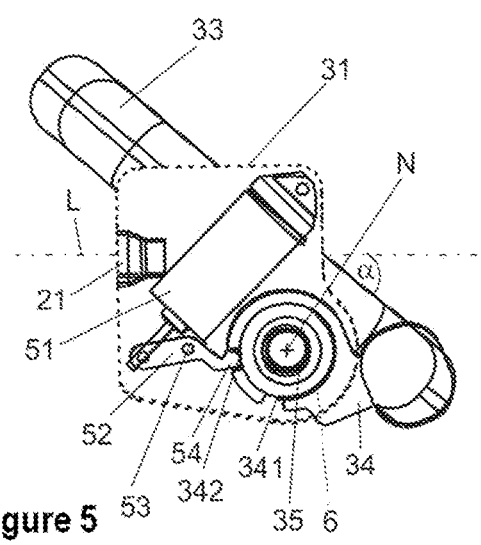
FIG. 5 is a diagram of a steering wheel in a view as in FIG. 4 in the stowed position, in the release position.

In FIG. 3, the actuator 51 is situated in the release position, in which the cam 54 is removed from the depression 341. As a result, the steering wheel rim 33 can be rotated with regard to the inclination axis N and can be inclined forward with respect to the longitudinal axis L, as indicated by way of the arrow. As a result, the steering wheel rim 33 is moved into the stowed position, as shown in FIGS. 4 and 5. In said stowed position, the steering wheel rim 33 is inclined at a flatter angle with respect to the longitudinal axis L on its side which lies opposite the bearing 35 than in the operating position, that is to say at a flat angle α (alpha) which is smaller than 90°. As a result, the steering wheel rim 33 is therefore folded, as it were, against the longitudinal axis L with its side which lies opposite the bearing 34, 35.

FIG. 4 shows the situation before the final stowed position is reached, the actuator 51 first of all still being situated in the release position, and the cam 54 not being connected in a positively locking manner to the bearing sleeve 34. When the stowed position is reached, the actuator 51 is actuated, with the result that the fixing element 52 is moved into the fixing position. After the fixing position is reached, the cam 54 is brought into a positively locking engagement with the second depression 342. As a result, the steering wheel rim 33 is fixed to the steering wheel hub 31 with regard to a rotation about the inclination axis N, and is therefore locked in the stowed position.

FIGS. 2 to 5 show the phases of a method according to the invention for adjusting the steering wheel 3, in the case of which method the fixing element 52 of the fixing device 5 is moved into the release position by way of the actuator 51 in the operating position of the steering wheel rim 33 (FIG. 3), the steering wheel rim 33 is inclined about the inclination axis N relative to the steering wheel hub 31 (FIG. 4) and is tilted into the stowed position, and subsequently the fixing element 52 of the fixing device is moved into the fixing position by way of the actuator 51 in the stowed position (FIG. 5), in which fixing position said fixing element 52 locks the steering wheel rim 33 in a positively locking manner.

In order to move the steering wheel rim 33 out of the stowed position into the operating position, a movement is carried out in the opposite order.

Figure 6:
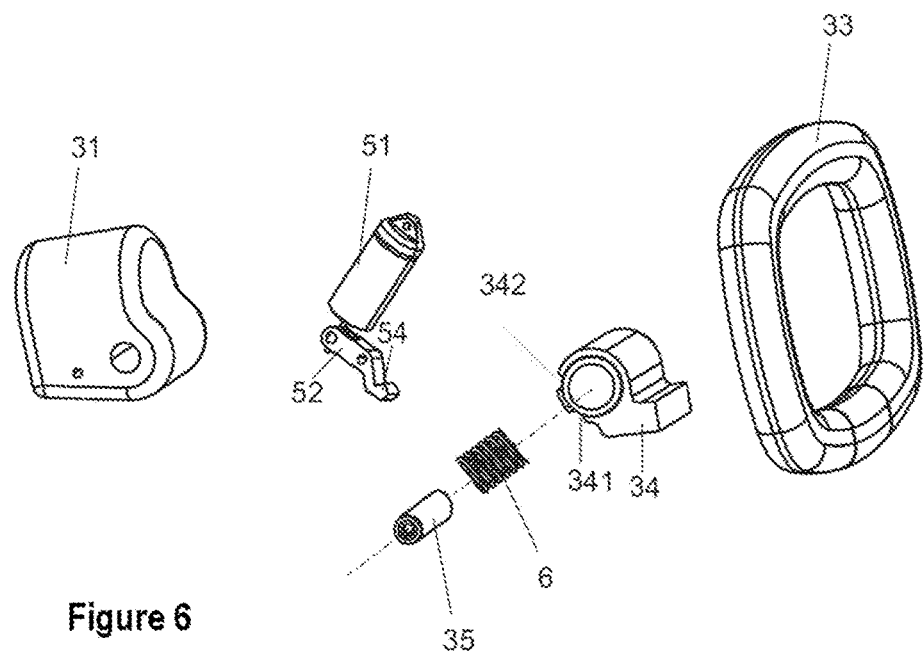
FIG. 6 is a perspective view exploded diagram of a steering wheel according to FIGS. 2-5.

The individual functional elements of the steering wheel 3 are shown in an exploded state in the exploded illustration in accordance with FIG. 6.

The steering wheel rim 33 can be moved manually between the operating position and the stowed position. A torque generating device with a spring element 6 can also be prom vided between the steering wheel hub 31 and the steering wheel rim 33. The spring element 6 is arranged coaxially on the bearing pin 35, such that it is prestressed against the steering wheel rim 33 in the stowed position which is shown in FIGS. 4 and 5, and exerts a torque about the inclination axis N on the steering wheel rim 33 in a manner which is assisted by way of the spring force on the steering wheel hub 31. By way of the spring force, the steering wheel rim 33 is moved into the operating position according to FIG. 3 during the release of the fixing element 52, that is to say is erected counter to the inclination in the stowed position with respect to the longitudinal axis L.

Counter to the spring force of the spring element 6, the steering wheel rim 33 can be inclined manually into the stowed position and can be stowed in autonomous driving operation. Here, the spring element 6 serves as an energy store, the stored spring energy providing the torque for correcting the steering wheel rim 33 as required, as described in the preceding text.

The spring element 6 can be configured, for example, as a helical spring, as shown in FIG. 6, which is arranged on the bearing pin 35 and prestresses the bearing sleeve 34 elastically in the circumferential direction. In FIGS. 2 to 5, the view of the spring element 6 is concealed by way of the bearing sleeve 34.

It can be seen clearly in FIGS. 4 and 5 how the steering wheel hub 31 is situated in a space-saving manner within the steering wheel rim 33 in the stowed position.

Even if a steer-by-wire steering system is shown here in the example, the invention can preferably also be applied to motor vehicles having an electromechanical power steering system.

LIST OF DESIGNATIONS

1 Steering system
2 Steering column
21 Steering spindle
22 Supporting unit
23 Control unit
3 Steering wheel
31 Steering wheel hub
32 Fastening opening
33 Steering wheel rim
34 Bearing sleeve 341 Depression
342 Depression
35 Bearing pin
4 Steering drive
40 Line
41 Actuating motor
42 Steering gear
43 Pinion
44 Rack
45 Track rod
46 Wheel
47 Roadway
5 Fixing device
51 Actuator
52 Fixing element
52 Pivot axis
54 Cam
6 Spring element
L Longitudinal axis
N Inclination axis
a Spacing
D Spacing
α(alpha) Angle

What is claimed is:

1. A steering wheel for a motor vehicle steering system, comprising:
    a rotatably mounted steering spindle;
    a steering wheel hub defining a longitudinal axis and attached coaxially to the rotatably mounted steering spindle;
    a steering wheel rim attached to the steering wheel hub and radially spaced apart from the longitudinal axis and extending in a planar manner transversely with respect to the longitudinal axis;
    a bearing configured to mount the steering wheel rim on the steering wheel hub such that the steering wheel rim is permitted to incline with respect to the longitudinal axis between an operating position and a stowed position about an inclination axis which lies transversely with respect to the longitudinal axis, wherein the steering wheel rim is inclined at a flatter angle with respect to the longitudinal axis in the stowed position than in the operating position; and
    a torque generating device configured to exert a torque on the steering wheel rim about the inclination axis, wherein the torque generating device has an energy store or a force accumulator that is configured to move the steering wheel rim from the stowed position into the operating position.

2. The steering wheel of claim 1, wherein the inclination axis is at a radial spacing from the longitudinal axis, which radial spacing is smaller than a radial spacing of the steering wheel rim from the longitudinal axis.

3. The steering wheel of claim 1, including a releasable fixing device configured to permit the steering wheel hub to move selectively into at least one fixing position or one release position, the steering wheel rim being fixed relative to the steering wheel hub in a fixing position, and permitting the steering wheel rim to be inclined relative to the steering wheel hub in the release position.

4. The steering wheel of claim 2, wherein the fixing device includes an adjustable fixing element which is supported on the steering wheel hub and, in the fixing position, is configured to engage with a corresponding counter-element on the steering wheel rim.

5. The steering wheel of claim 2, wherein the fixing device includes a motorized actuator configured to set the fixing position or the release position in a motorized manner.

6. A steering wheel comprising:
    a rotatably mounted steering spindle;
    a steering wheel hub defining a longitudinal axis and attached coaxially to the rotatably mounted steering spindle;
    a steering wheel rim attached to the steering wheel hub and radially spaced apart from the longitudinal axis and extending in a planar manner transversely with respect to the longitudinal axis;
    a bearing configured to mount the steering wheel rim on the steering wheel hub such that the steering wheel rim is permitted to incline with respect to the longitudinal axis between an operating position and a stowed position about an inclination axis that lies transversely with respect to the longitudinal axis, wherein the steering wheel rim is inclined at a flatter angle relative to the longitudinal axis in the stowed position than in the operating position; and
    a releasable fixing device configured to permit the steering wheel hub to move selectively into a fixing position or a release position, the steering wheel rim being fixed relative to the steering wheel hub in the fixing position, the steering wheel rim being inclinable relative to the steering wheel hub in the release position, the releasable fixing device including an adjustable fixing element that is supported on the steering wheel hub and, in the fixing position, is configured to engage with a corresponding counter-element on the steering wheel rim, wherein the adjustable fixing element is configured in or positionable in the bearing.

7. The steering wheel of claim 6 wherein the inclination axis is at a radial spacing from the longitudinal axis, the radial spacing being smaller than a radial spacing of the steering wheel rim from the longitudinal axis.

8. The steering wheel of claim 6 wherein the adjustable fixing device includes a motorized actuator configured to set the fixing position or the release position in a motorized manner.

9. The steering wheel of claim 6 including a torque generating device disposed between the steering wheel hub and the steering wheel rim, the torque generating device configured to exert a torque on the steering wheel rim about the inclination axis.

10. The steering wheel of claim 6 wherein the torque generating device has an energy store.

11. A steering wheel for a motor vehicle steering system, comprising:
    a rotatably mounted steering spindle;
    a steering wheel hub defining a longitudinal axis and attached coaxially to the rotatably mounted steering spindle;
    a steering wheel rim attached to the steering wheel hub and radially spaced apart from the longitudinal axis and extending in a planar manner transversely with respect to the longitudinal axis; and
    a bearing configured to mount the steering wheel rim on the steering wheel hub such that the steering wheel rim is inclinable relative to the longitudinal axis between an operating position and a stowed position about an inclination axis that lies transversely with respect to the longitudinal axis, wherein the steering wheel rim is inclined at a flatter angle relative to the longitudinal axis in the stowed position than in the operating position, wherein the inclination axis is at a radial spacing from the longitudinal axis, the radial spacing being smaller than a radial spacing of the steering wheel rim from the longitudinal axis.

12. The steering wheel of claim 11 comprising a releasable fixing device configured to permit the steering wheel hub to move selectively between a fixing position and a release position, the steering wheel rim being fixed relative to the steering wheel hub in the fixing position, the steering wheel rim being inclinable relative to the steering wheel hub in the release position.

13. The steering wheel of claim 12 wherein the releasable fixing device includes an adjustable fixing element that is supported on the steering wheel hub and, in the fixing position, is configured to engage with a corresponding counter-element on the steering wheel rim.

14. The steering wheel of claim 12 wherein the releasable fixing device includes a motorized actuator configured to set the fixing position or the release position in a motorized manner.

15. The steering wheel of claim 11 comprising a torque generating device configured to exert a torque on the steering wheel rim about the inclination axis.

16. The steering wheel of claim 15 wherein the torque generating device has an energy store.

17. The steering wheel of claim 11 comprising:

a torque generating device configured to exert a torque on the steering wheel rim about the inclination axis; and a releasable fixing device configured to permit the steering wheel hub to move selectively between a fixing position where the steering wheel rim is fixed relative to the steering wheel hub and a release position where the steering wheel rim is inclinable relative to the steering wheel hub, the releasable fixing device including a motorized actuator for setting the fixing position or the release position in a motorized manner.

* * * * *